Patented May 30, 1939

2,160,115

UNITED STATES PATENT OFFICE 2,160,115

MATCH

William W. Bell, Tenafly, N. J., assignor to Celluloid Corporation, a corporation of New Jersey No Drawing. Application January 25, 1935, Serial No. 3,502. Renewed November 12, 1937

2 Claims. (Cl. 44—46)

This invention relates to the treatment of articles of wood, and similar materials, for instance, match sticks, railroad ties, flooring, shingles, poles, ship timber, etc., to render same fireproof, fire retardant and/or preserved against decay, insect infestation, etc. This invention relates more particularly to the coating or impregnating articles of wood and/or like porous or fibrous articles with a tri-alkyl, aryl or alkyl-aryl phosphate, an outstanding example of which is tricresyl phosphate.

An object of this invention is the economic and expeditious treatment of articles of wood and similar material to reduce its flammability and increase its resistance to rotting or otherwise fast deterioration upon exposure to the elements. Another object of the invention is the fireproofing of a part of the match stick opposite to the head. Other objects of the invention will appear from the following detailed description.

One particular embodiment of this invention is the fire-proofing of that part of match sticks normally held by the fingers when employing lighted matches or that part of the match stick from less or more than a half its length at the end opposite the head. Any suitable fireproofing agent may be employed for this purpose such as ammonium salts for instance ammonium bromide and diammonium hydrogen phosphate, zinc chloride, artificial waxes made by chlorinating naphthalene, chlorinated diphenyls and like materials. I have found however that the preferred fireproofing material is an alkyl or aryl phosphate as these have the property of fireproofing the match stick, being colorless, odorless and tasteless and do not deteriorate or evaporate upon standing. Match sticks so treated have the advantage of not burning down and injuring the fingers, they go out by themselves after a certain limited burning and no afterglow or flameless burning part remains. These matches are extremely safe, as a lighted match dropped on a floor or other place has a limited life and is therefore less liable to start an unintended fire. Matches so treated, when they have burned to the point of fireproofing, immediately go out and quickly cool down without holding a red hot centre part as do untreated matches. When the match burns out there is no afterglow and this in itself is a safeguard against unintended fires.

Another embodiment of this invention is the simultaneous treatment of wooden articles to render them slow burning and/or fireproof and resistant to decay, rot or attack by the elements such as water, bacteria, fungi, insects and salts such as contained in sea water. The wood so treated has the advantage over creosoted wood in that no offensive odor is produced nor a material change in color. Furthermore, wood so treated may be coated with paint, lacquer and the like which do not adhere to fireproofed wood processed by the prior processes. Wooden articles fireproofed by impregnating same with an organic ester of phosphoric acid may be painted, enameled and/or otherwise coated for color effect and surface protection as the fireproofing material, if anything, increases the acceptability of the wood to take and retain such coatings.

In accordance with my invention, I coat or impregnate wooden articles with a tri-alkyl, aryl or alkyl-aryl ester of phosphoric acid to render the same fireproof and preserved against fast decay or deterioration upon exposure to water, atmosphere and earth. Also, in accordance with my invention, I fireproof and preserve a part of a wooden article, leaving the remaining part untreated such as fireproofing and preserving that part of matches held by the fingers when employing same.

Although the preferred treating substance contains tricresyl phosphate, it may be replaced in whole or in part with any suitable alkyl, aryl or alkyl-aryl phosphate. Thus, broadly, any of the organic esters of the phosphoric acids may be employed and especially those that are non-volatile at normal temperatures, water insoluble and chemically stable or inactive. Examples of the phosphoric esters that are applicable are the homogeneous aryl phosphoric acid ester as

where R refers to any radical of any one of the phenols; the mixed aryl phosphoric acid esters as

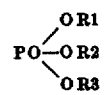

where R1, R2 and R3 represent at least two different radicals of the phenols; the homogeneous alkyl phosphoric acid esters as

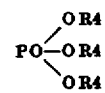

where R4 represents any alkyl radical; the mixed alkyl esters of phosphoric acid as

where R5, R6 and R7 represent at least two different radicals of hydroxy aliphatic compounds; and the mixed alkyl-aryl esters of phosphoric acid a

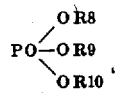

where R8, R9 and R10 are either phenyl radicals and/or radicals of hydroxy aliphatic compounds, such as butyl alcohol, ether glycols and polyglycols, etc.

Examples of some of phosphoric acid esters are tributyl phosphate, triamyl phosphate, tribetachlorethyl phosphate, triphenyl phosphate, dibutyl phenyl phosphate, tricresyl phosphate (all isomers and chemical mixtures of same as more fully described in U. S. applications No. 706,360 filed January 12, 1934; No. 718,436 March 31, 1934; and No. 720,448 filed April 13, 1934) monocresyldiphenyl phosphate, trixylenyl phosphate, trinaphthyl phosphate, tribenzyl phosphate, triorthodiphenyl phosphate, phosphate esters of glycol ethers and the corresponding thio phosphates of some of the above compounds.

This invention is applicable to any wooden article that it is desired to fireproof, make slow burning and/or preserve. Examples of such articles are, finger holding portion of match sticks, railroad ties and platform timbers, warehouse floor boards, piers, piles, boardwalks, barn or other building boards, shingles, etc. It is also applicable in a special way to timbers and siding used in the construction of ships as it not only fireproofs and preserves but also aids in retaining a coating of paint, lacquer, varnish, etc., and increases the woods resistance to the destructive elements of sea water such as the action of salts, dry rot, marine life, etc.

The wooden articles may be treated with the material in any suitable manner. When small, thin, light or porous wood is employed such as found in match sticks, etc., the mere dipping of same in the liquid treating material is found sufficient. In treating large poles and railroad ties and the like, the wood may first have a vacuum applied thereto and then the treating liquid forced into the wood under pressure. In certain cases, the wood may be soaked in heated treating liquid.

For treating match sticks, the match stick may be caused to dip the desired depth into a treating liquid consisting of a liquid organic ester of phosphoric acid such as tricresyl phosphate. However, if desired, the match sticks or any other wooden article may be partially or wholly impregnated with organic esters of phosphoric acid, such as triphenyl phosphate, which is normally solid but for the purpose of treating maintained in a molten or fluid state. Aqueous emulsions of the above phosphate esters may also be satisfactorily employed.

Other materials may be incorporated in the treating material such as ammonium salts, chlorinated naphthalenes, chlorinated diphenyls, etc. The fireproofing material, if solid, may be dissolved in a solvent or if liquid it may be thinned with a thinner, for example, acetone, alcohols, ethers, carbon tetrachloride, etc. The treating liquid may also contain solidifying materials such as resins, natural or artificial, and the esters or ethers of cellulose. Although the esters and ethers of cellulose are flammable, they become non-flammable when mixed with or dissolved in the organic ester or phosphoric acid. By incorporating such solidifying materials in the treating liquid, a more solid article is produced than the natural wood with the result that the wooden article is less apt to break. Examples of the esters and ethers of cellulose are cellulose nitrate, cellulose acetate, cellulose butyrate, cellulose propionate, methyl cellulose, ethyl cellulose, benzyl cellulose and nitrated cellulose acetate.

As illustrations and not as limitations the following examples of treating liquids are given:

Example I

Liquid tricresyl phosphate.

This material readily penetrates soft woods as spruce, white pine, etc. The wood properly treated with same will not burn except with a very high applied heat. There is no odor, color or tackiness imparted to the wood. Paints, lacquers and varnishes may be applied to the treated wood. Soft wood of less than 1 inch thickness may be fireproofed by immersion for 5 minutes or less in the liquid. Hard woods such as oak, mahogany, etc., or articles over 1 inch in thickness may require longer periods of treatment. Much less than 1 minute is required for treating small articles such as match sticks.

Example II

| | Parts |
|---|---|
| Liquid tricresyl phosphate | 100 |
| Nitro cellulose or equivalent | 10–25 |
| Mutual solvent (acetone) | 300 |

The wooden article is dipped if small, and soaked if large, in the bath, removed and dried. The wooden article is impregnated and coated with the tricresyl phosphate and solidifying material. Soft woods are made more firm and will not burn without applied heat.

Example III

| | Parts |
|---|---|
| Liquid tricresyl phosphate | 100 |
| Cellulose acetate | 10–20 |
| Mutual solvent (mixture of chloroform 85%, methyl alcohol 15%) | 300–400 |
| Ammonium salt (phosphate) | 12–30 |

The wooden article is dipped if small, and soaked if large, in the bath, removed and dried. The results are the same as those of Example II.

Paper or book matches may be treated according to this invention in a manner similar to wood matches. Thus, in the making of matches, about one half the stem, whether paper or wood, may be treated with a paraffin to cause its quick catching aflame and to support the combustion, while the remaining part or at least a section of the remaining part may be treated with a fireproofing material. The head, whether of the safety type or strike anywhere type, may be placed upon the paraffin treated end. Any order of treatments may be employed, for instance, the handle end of the match stem may be fireproofed after the match is otherwise completed.

It is to be understood that the foregoing detailed description is merely given by way of illustration and many alterations may be made therein without departing from the spirit of my invention.

Having described my invention, what I desire to secure by Letters Patent is:

1. A fireproof match capable of being stained or printed comprising a stem of combustible material having a head at one end and a portion of the other end impregnated with a fireproofing material containing an aryl ester of phosphoric acid.

2. A fireproof match capable of being stained or printed comprising a stem of combustible material having a head at one end and a portion of the other end impregnated with a fireproofing material containing tricresyl phosphate.

WILLIAM W. BELL.

CERTIFICATE OF CORRECTION.

Patent No. 2,160,115.   May 30, 1939.

WILLIAM W. BELL.

It is hereby certified that error appears in the printed specification of the above numbered patent requiring correction as follows: Page 2, first column, line 26, after the serial number "718,436" insert the word filed; and second column, line 7, for "or" read of; and that the said Letters Patent should be read with this correction therein that the same may conform to the record of the case in the Patent Office.

Signed and sealed this 4th day of July, A. D. 1939.

Henry Van Arsdale (Seal)   Acting Commissioner of Patents.

Having described my invention, what I desire to secure by Letters Patent is:

1. A fireproof match capable of being stained or printed comprising a stem of combustible material having a head at one end and a portion of the other end impregnated with a fireproofing material containing an aryl ester of phosphoric acid.

2. A fireproof match capable of being stained or printed comprising a stem of combustible material having a head at one end and a portion of the other end impregnated with a fireproofing material containing tricresyl phosphate.

WILLIAM W. BELL.

CERTIFICATE OF CORRECTION.

Patent No. 2,160,115.   May 30, 1939.

WILLIAM W. BELL.

It is hereby certified that error appears in the printed specification of the above numbered patent requiring correction as follows: Page 2, first column, line 26, after the serial number "718,436" insert the word filed; and second column, line 7, for "or" read of; and that the said Letters Patent should be read with this correction therein that the same may conform to the record of the case in the Patent Office.

Signed and sealed this 4th day of July, A. D. 1939.

(Seal)

Henry Van Arsdale
Acting Commissioner of Patents.